(12) United States Patent
Tanaka et al.

(10) Patent No.: US 7,362,371 B1
(45) Date of Patent: Apr. 22, 2008

(54) CAMERA USING CONDUCTIVE CAMERA ELEMENT AS RADIO ANTENNA

(75) Inventors: Hiroshi Tanaka, Asaka (JP); Mikio Watanabe, Asaka (JP)

(73) Assignee: Fujifilm Corporation, Tokyo (JP)

( * ) Notice: Subject to any disclaimer, the term of this patent is extended or adjusted under 35 U.S.C. 154(b) by 710 days.

(21) Appl. No.: 09/708,081

(22) Filed: Nov. 8, 2000

(30) Foreign Application Priority Data

Nov. 8, 1999 (JP) ................................. 11-316600

(51) Int. Cl.
*H04N 5/225* (2006.01)
(52) U.S. Cl. .................................... 348/373; 348/211.2
(58) Field of Classification Search ................ 348/373, 348/211.1, 211.3, 14.01
See application file for complete search history.

(56) References Cited

U.S. PATENT DOCUMENTS

| | | | | |
|---|---|---|---|---|
| 3,602,122 | A * | 8/1971 | Fauth .......................... | 396/179 |
| 3,950,767 | A * | 4/1976 | Matsui ........................ | 396/258 |
| 4,337,383 | A * | 6/1982 | Daigaku ................... | 200/51.09 |
| 4,949,077 | A * | 8/1990 | Mbuthia ..................... | 340/628 |
| 5,528,293 | A | 6/1996 | Watanabe | |
| 5,612,732 | A * | 3/1997 | Yuyama et al. ............. | 348/373 |
| 5,757,332 | A * | 5/1998 | Hanaoka et al. ............ | 343/787 |
| 5,825,413 | A * | 10/1998 | Mullis ....................... | 348/211.1 |
| 5,949,474 | A * | 9/1999 | Gerszberg et al. ....... | 348/14.01 |
| 5,983,119 | A * | 11/1999 | Martin et al. ............. | 455/575.7 |
| 6,038,295 | A * | 3/2000 | Mattes ..................... | 348/211.3 |
| 6,069,648 | A * | 5/2000 | Suso et al. ............... | 348/14.02 |
| 6,204,877 | B1 * | 3/2001 | Kiyokawa ................. | 348/211.3 |
| 6,262,767 | B1 * | 7/2001 | Wakui ................... | 348/211.99 |
| 6,384,587 | B2 * | 5/2002 | Aizawa et al. .............. | 323/355 |
| 6,510,325 | B1 * | 1/2003 | Mack et al. ............. | 455/575.2 |
| 6,710,807 | B1 * | 3/2004 | Yamagishi .................. | 348/362 |
| 6,717,801 | B1 * | 4/2004 | Castell et al. ............... | 361/683 |

FOREIGN PATENT DOCUMENTS

| | | |
|---|---|---|
| JP | 61-181203 A | 8/1986 |
| JP | 62-284338 A | 12/1987 |
| JP | 1-212178 A | 8/1989 |
| JP | 2-242245 A | 9/1990 |
| JP | 3-133268 A | 6/1991 |
| JP | 3-154482 A | 7/1991 |
| JP | 4-233095 A | 8/1992 |
| JP | 4-278282 A | 10/1992 |
| JP | 6-85730 A | 3/1994 |
| JP | 7-15270 Y2 | 4/1995 |
| JP | 8-9354 A | 1/1996 |
| JP | 8-36143 A | 2/1996 |
| JP | 8-163466 A | 6/1996 |

(Continued)

*Primary Examiner*—Lin Ye
*Assistant Examiner*—Gevell Selby
(74) *Attorney, Agent, or Firm*—Birch, Stewart, Kolasch & Birch, LLP

(57) ABSTRACT

To provide a camera capable of performing radio communication with other unit by jointly using a conductive component previously provided for the camera as a radio antenna without using an independent radio antenna. Because a conductive component (e.g. a reflector of flash) previously provided for an electronic camera and insulated from a camera housing but not electromagnetically shielded is jointly used as a radio antenna, the electronic camera can perform radio communication with other unit without using an independent antenna.

10 Claims, 7 Drawing Sheets

FOREIGN PATENT DOCUMENTS

| | | |
|---|---|---|
| JP | 09116778 A | 5/1997 |
| JP | 2722230 B2 | 11/1997 |
| JP | 10-20388 A | 1/1998 |
| JP | 10-254021 A | 9/1998 |
| JP | 11-150410 A | 6/1999 |

* cited by examiner

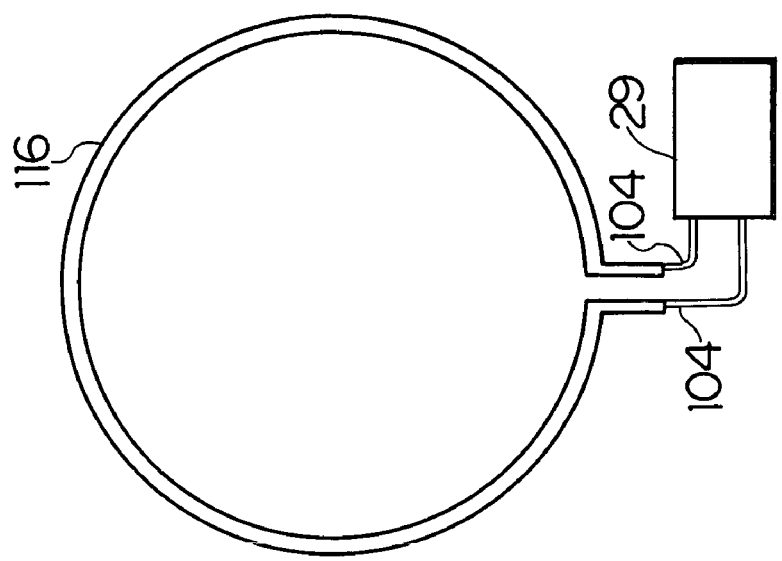
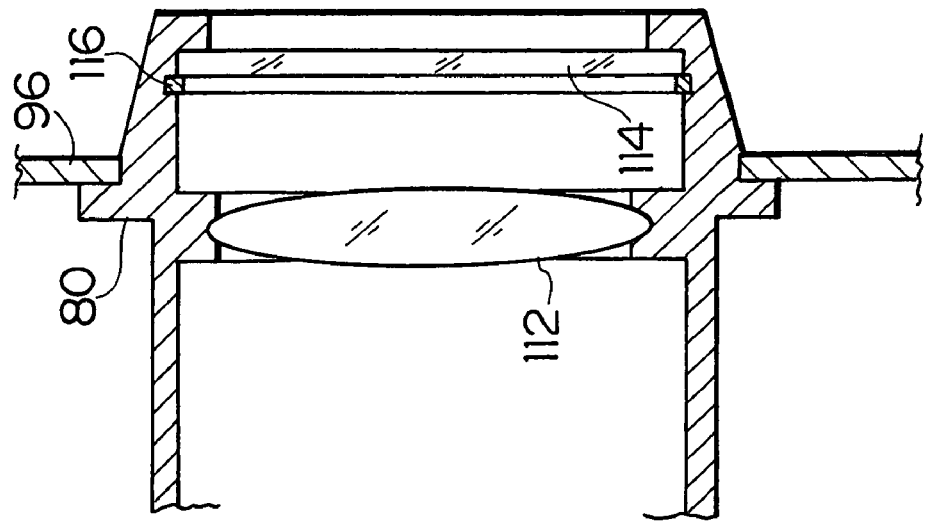

CAMERA USING CONDUCTIVE CAMERA ELEMENT AS RADIO ANTENNA

BACKGROUND OF THE INVENTION

1. Field of the Invention

The present invention relates to a camera, particularly to a camera provided with a radio communication antenna used to perform radio communication with other unit.

2. Description of Related Art

Japanese Patent Laid-Open No. 9-116778 specification discloses a compact electronic camera system provided with a rod antenna for radio communication allowing high-speed image-data transmission and having superior operability and portability.

However, the antenna for radio communication of the electronic camera disclosed in Japanese Patent Laid-Open No. 9-116778 specification is a rod antenna that protrudes beyond the camera. It is generally necessary to make a camera compact and attitudes of a camera, which is different from general communication devices are generally changed for longitudinal-position photographing, upward photographing, and downward photographing in accordance with an object. Therefore, troubles have occurred that a position of an antenna cannot be limited, radio communication performance is deteriorated, a user unconsciously covers the antenna, or touches the antenna, and resultantly communication performance is deteriorated.

Moreover, when connecting an electronic camera with a portable radio communication terminal by a cable to radio-transmit the image data in the electronic camera, troubles have occurred that a user unconsciously covers the antenna section of the radio communication terminal and an antenna turns to a direction not suitable for radio communication, and thereby radio communication performance is deteriorated. Moreover, troubles have occurred that an electronic camera increases in size and the cost is increased when using a conventional structure in which an antenna for radio communication protrudes beyond the electronic camera.

SUMMARY OF THE INVENTION

The present invention is made to solve the above problems and its object is to provide a camera allowing radio communication with other unit without using an independent radio antenna by jointly using a conductive component previously provided for the camera as a radio antenna.

To achieve the above object, the present invention is directed to a camera comprising: a communication device which allows radio communication with other unit; and a radio antenna, wherein a conductive component previously provided for the camera and insulated from a camera housing but not electromagnetically shielded is jointly used as the radio antenna.

According to the present invention, because a conductive component previously provided for a camera and insulated from a camera housing but not electromagnetically shielded is jointly used as a radio antenna, the camera allows radio communication with other unit without using an independent radio antenna.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 7(a) is a sectional view showing an example in which a radio antenna is mounted on a lens tube and FIG. 7(b) is a front view showing an example in which a radio antenna is used as a loop antenna.

DETAILED DESCRIPTION OF THE PREFERRED EMBODIMENT

The preferred embodiment of a camera of the present invention is described below in detail by referring to the accompanying drawings.

Figure 1:
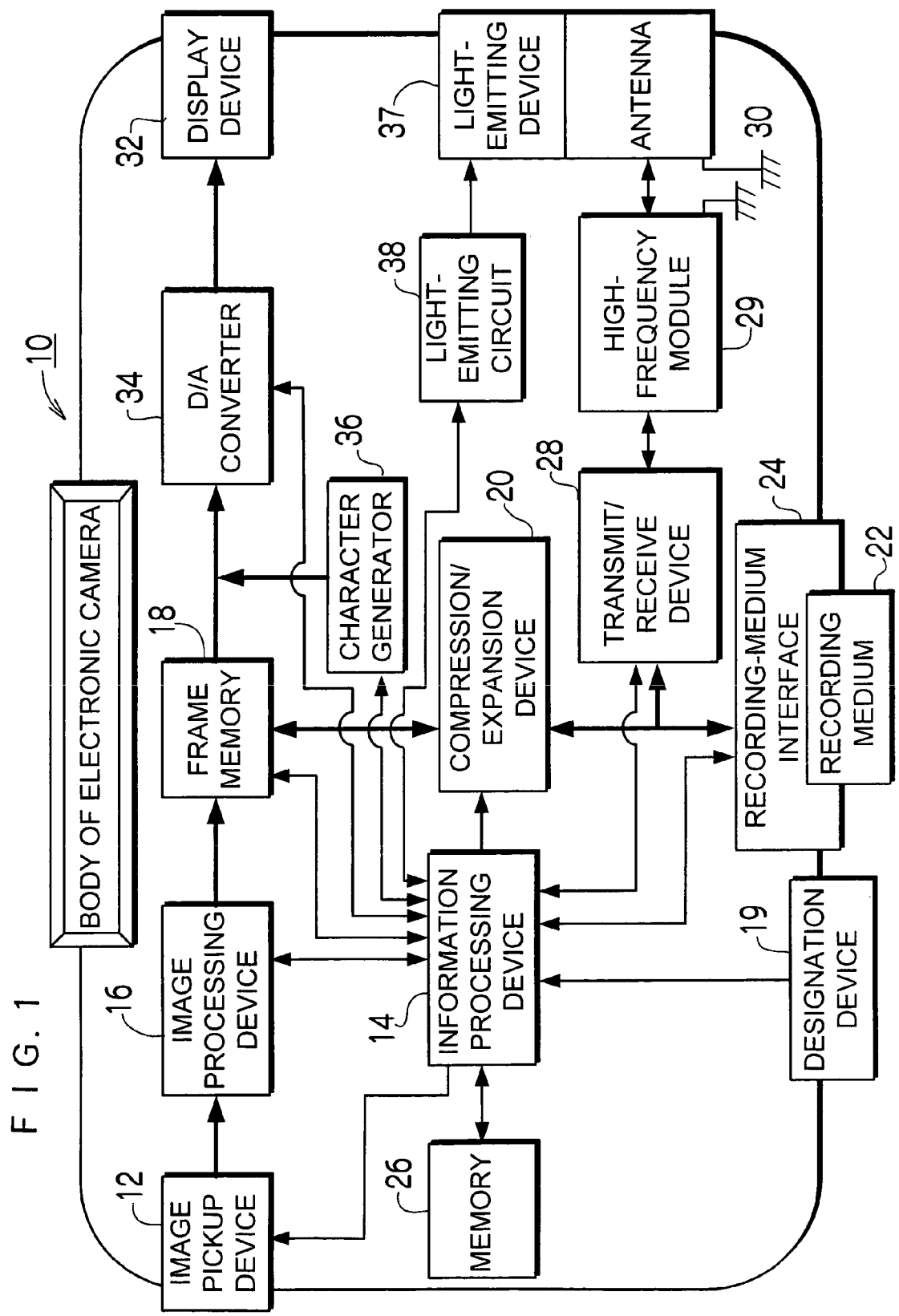
FIG. 1 is a block diagram of an electronic camera.

FIG. 1 is a block diagram of an electronic camera 10 allowing radio communication.

The camera 10 comprises an image pickup device 12 for focusing the image of an object on a light-receiving plane to photoelectrically convert the image, and outputting the image as image data; an information processing device 14 for performing general control of the electronic camera 10, image-data sampling timing control, image-data recording control, image-data graphic recognition, image-data flickering recognition, and read of information for the type of the electronic camera 10, communication control, and display control; an image processing device 16 for performing change of image sizes, sharpness correction, gamma correction, contrast correction, and white balance correction; a frame memory 18 for temporarily storing image data, a designation device 19 provided with a release button, communication button, transmission button, function switch, cross key, decision switch, and mode change dial; a compression/expansion device 20 for compressing or expanding the information of image data or the like through the technique such as JPEG or motion JPEG or expanding, developing, and controlling compressed data; and a recording-medium interface 24 for converting data in order to record or read image data in or from a removable recording medium 22. The recording medium 22 is a removable recording medium represented by a semiconductor such as a memory card of MO, magnetic recording, or optical recording.

The information processing device 14 connects with a ROM storing the type and the intrinsic number such as serial number of the electronic camera 10, an operating program, and various constants, and a memory 26 configured by a RAM which is a storage device serving as a work area when the program is executed.

The radio communication device of the electronic camera 10 used to transmit and receive image data or the like with an external unit through communication is configured by a transmit/receive device 28 for transmitting and receiving information such as image data by a command from the information processing device 14, a high-frequency module 29 for transmitting the information such as image data by superposing it on generated carriers and an antenna 30 for transmitting and receiving carriers and data through radio.

Moreover, the electronic camera 10 is provided with a D/A converter 34 for displaying image data on a display device 32, a character generator 36 for converting the code information commanded by the information processing device 14 into data of characters or message to be displayed, a light-emitting device 37 for emitting light simultaneously with photographing to compensate the deficiency of light quantity when photographing an object, and a light-emitting circuit 38 for storing the power for making the light-emitting device 37 emit light, outputting a signal for ordering light emission at the timing of photographing, and adjusting the light quantity of the object.

Photographing by the electronic camera 10 having the above constitution will be described below.

An image to be photographed is focused on the light-receiving plane of the image pickup device 12, and the focused object image is photoelectrically converted and output to the image processing device 16. Image data thus obtained is amplified and reduced in noises by the image processing device 16 and temporarily stored in the frame memory 18. The information processing device 14 sequentially transfers the image data stored in the frame memory 18 to the D/A converter 34 to display the data on the display device 32.

By pressing a release button provided for the designation device 19, a mode for photographing an object is set. Then, the information processing device 14 transfers the image data stored in the frame memory 18 to compression/expansion device 20 and outputs a command for compressing the image data under a predetermined condition. Then, the information processing device 14 sequentially records image data in the recording medium 22 for the recording-medium interface 24. When the light quantity of the object is insufficient for photographing, the information processing device 14 previously stores the power for light emission in the light emitting circuit 38 to make the light-emitting device 37 emit light at the timing for performing photographing by pressing the release button and stops light emission when determining that the light quantity of the object becomes proper in accordance with the light emission.

Figure 2:
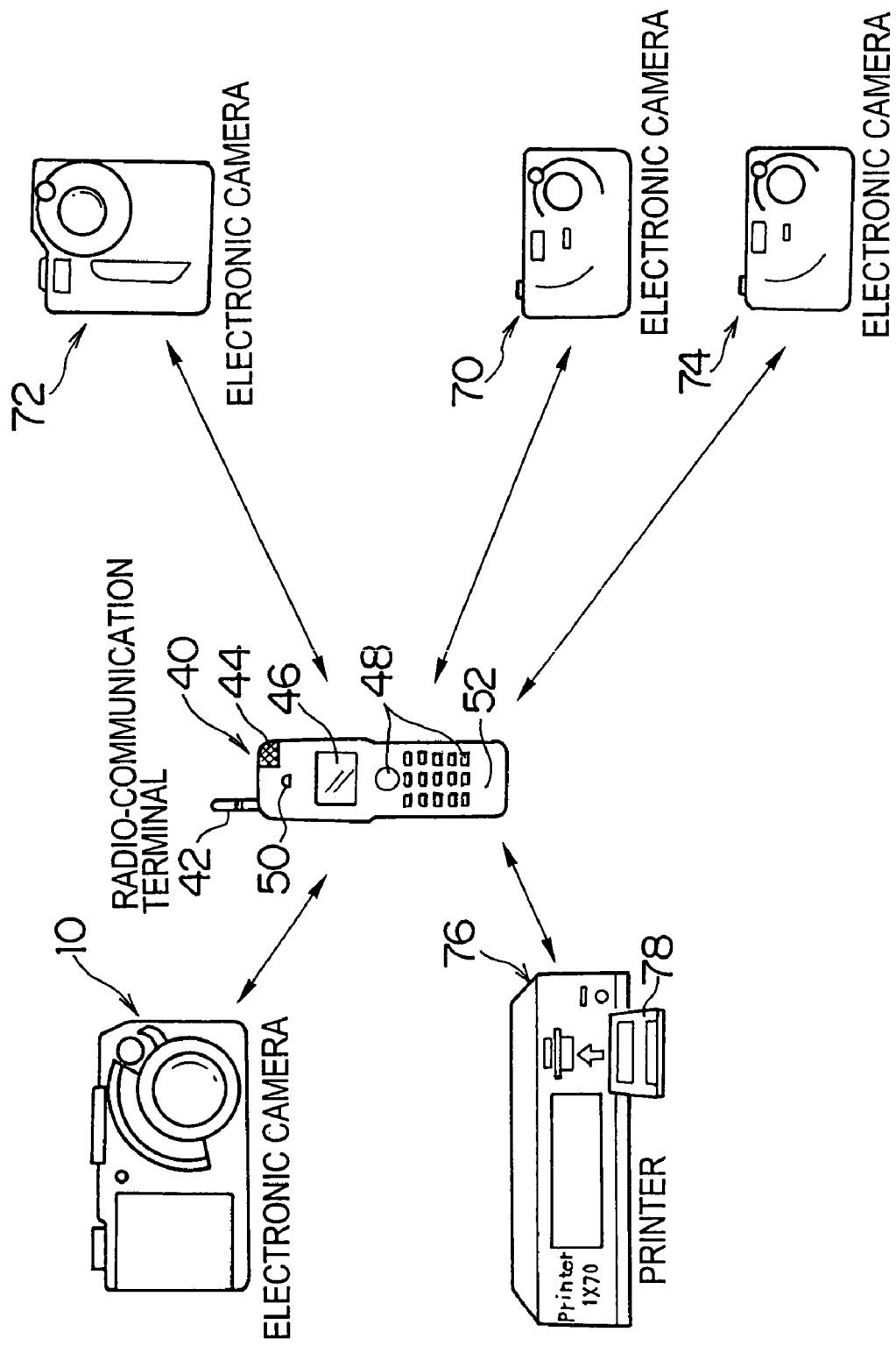
FIG. 2 is an illustration showing a plurality of connective units that can be connected each other through radio.

FIG. 2 shows a plurality of units that can be connected each other by radio.

According to FIG. 2, there are a plurality of radio-communicable electronic cameras 10, 70, 72, and 74 and a printer 76 to which a recording medium 78 can be set around a communication terminal 40 such as a radio telephone so that information such as image data can be transferred each other.

As shown in FIG. 2, the communication terminal 40 is provided with an antenna 42 for performing radio communication with a public line, a radio communication device 44 for performing close-range radio communication with a plurality of connective units present around, a display device 46 for displaying the information or image of a connective unit for communication, designation devices 48, 48, . . . for designating or selecting a connective unit, telephone number, character, or image or voice data and designating an output unit or the address of the data, a loud speaker 50 for serving as a receiver of a telephone and outputting voices, and a microphone 52 for inputting voices.

By pressing a transmission button provided for the designation device 19 of the electronic camera 10 after the electronic camera 10 establishes the communication with the communication terminal 40, the information processing device 14 sequentially reads designated image data from the recording medium 22 to convert the image data into a predetermined data format and then, transmits the data to the external communication terminal 40 through the transmit/receive device 28, the high-frequency module 29, and the antenna 30.

It is allowed to use a protocol according to the specification of "Bluetooth" or "Radio LAN" recently noticed as the protocol for close-range communication of the radio communication device 44. Moreover, the communication terminal 40 can use a mobile communication unit such as a portable telephone or PHS generally used or a personal computer or printer for transmitting the information such as image data through communication.

When the frequency of the radio wave used for radio communication reaches a radio frequency of approx. 2.5 GHz, the length of the radio wave becomes approx. 12 cm. Since it is allowed that the antenna length for radio communication resonates at values of ½, ¼, ⅛ . . . of the wavelength and communication is realized even by a weak radio wave only in the case of close-range radio communication, it is enough that the length of a radio antenna is approx. 1.5 cm. Therefore, it is possible to use a component previously provided for the electronic camera 10 and having a proper conductivity as a radio antenna. When independently providing an exclusive radio antenna for the electronic camera 10, a trouble occurs that the electronic camera 10 increases in size and thereby, interrupts operations.

Figure 3:
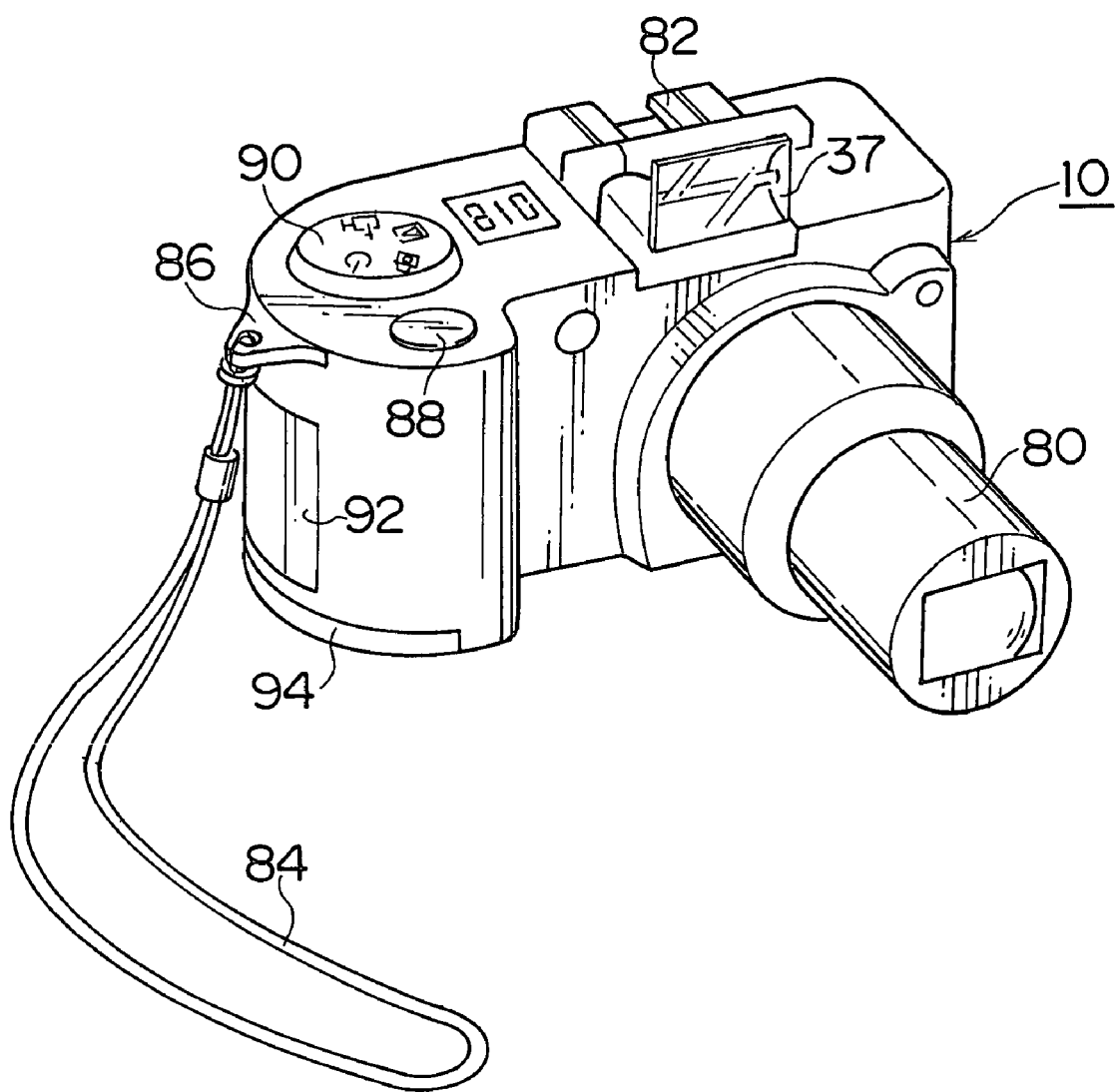
FIG. 3 is a perspective view showing an embodiment for a radio-antenna setting position.

FIG. 3 shows an embodiment for a setting position of a radio antenna.

As shown in FIG. 3, the electronic camera 10 includes a lens tube 80 provided with a lens for focusing the image of an object on the plane of a light receiving element during photographing, the light-emitting device 37 such as a flash, a hot shoe 82 to which an accessory such as an external flash will be set, a strap holder 86 to which a strap 84 for a user to carry the electronic camera 10 will be set, a release button 88 for designating photographing by the electronic camera, a mode-switching dial 90 for switching various operation modes of the electronic camera 10, a medium cover 92 serving as the cover of a storing section into which a recording medium removable from the electronic camera 10 will be inserted, and a battery cover 94 serving as a cover of a portion for storing a battery serving as the power source of the electronic camera 10.

A camera of the present invention realizes radio communication without deteriorating the portability or radio communication performance of the electronic camera 10 by providing a radio antenna constituted by a conductive component for portions not electromagnetically shielded such as the lens tube 80, the light-emitting device 37, the hot shoe 82, the strap holder 86, the release button 88, the mode-switching dial 90, the medium cover 92, and the battery cover 94.

Figure 4:
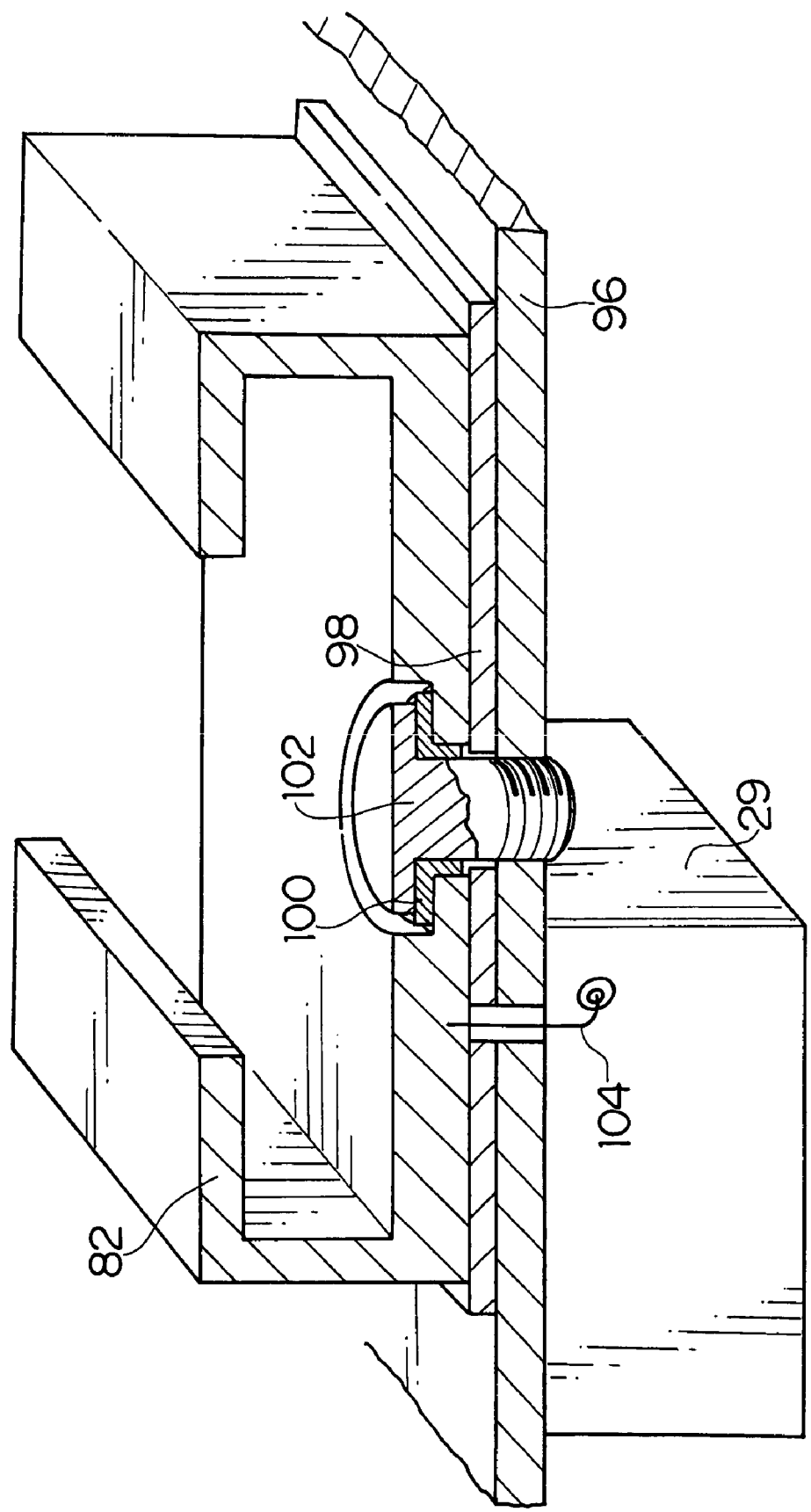
FIG. 4 is a sectional view showing an embodiment in which a radio antenna is provided for a hot shoe of an electronic camera.

FIG. 4 shows a sectional view of a detailed embodiment in which a radio antenna is provided for a hot shoe of an electronic camera.

In FIG. 4, the hot shoe 82 constituted by a conductive component for setting an accessory such as a flash to the electronic camera 10 is screwed to an armor member 96 of the electronic camera 10 through an insulating spacer 98 and an insulating washer 100 by a hot-shoe fixing screw 102. Therefore, even if the armor member 96 of the electronic camera 10 is made of a conductive material, the hot shoe 82 is fixed while being insulated from the armor member 96.

Because a cable 104 for a high frequency output from the high-frequency module 29 is connected to the hot shoe 82 and radio waves can be transmitted or received through the hot shoe 82, the hot shoe 82 functions as a radio antenna. Moreover, because the hot shoe 82 is a member exposed to the outside of the electronic camera 10 but it is not provided for a place to be unconsciously touched by a user, it is favorable to use the hot shoe 82 for communication as a radio antenna when performing radio communication. Moreover, because setting the high-frequency module 29 nearby the hot shoe 82 makes it possible to shorten a high-frequency cable, it is possible to efficiently transmit a generated high frequency from the hot shoe 82.

Figure 5:
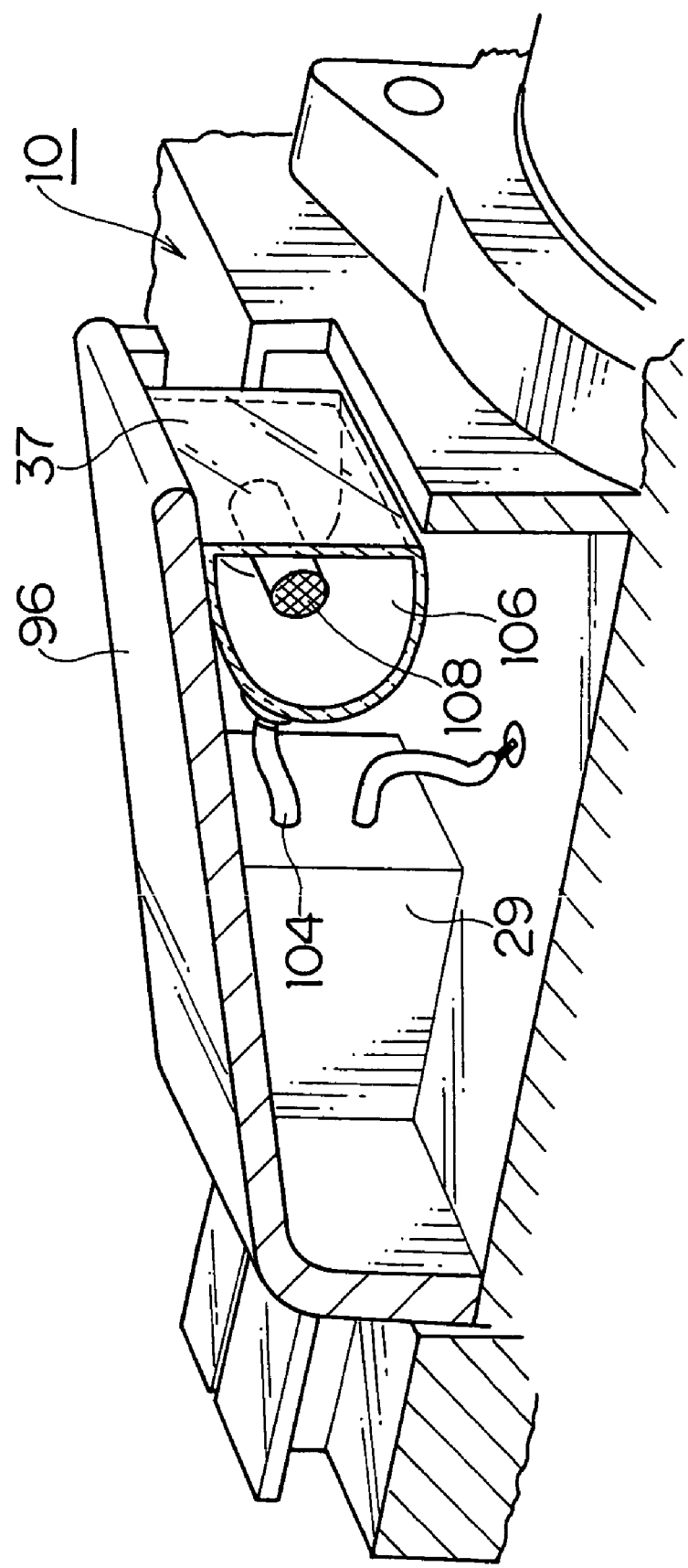
FIG. 5 is a sectional view showing an embodiment in which a radio antenna is provided for a light-emitting device of an electronic camera.

FIG. 5 shows a sectional view of a detailed embodiment in which a radio antenna is provided for the light-emitting device of an electronic camera.

In FIG. 5, the light-emitting device 37 of the electronic camera 10 is provided with a reflector 106 set to the armor member 96 of the electronic camera 10 to adjust the luminous intensity distribution of the light to be applied to an object and a discharge tube 108 for emitting light to the object. In general, the reflector 106 of the light-emitting device 37 is constituted by a conductive component and insulated from the armor member 96 because a voltage serving as a trigger for the discharge tube 108 to emit light is applied. Therefore, it is favorable to use the reflector 106 as a radio antenna.

The cable 104 for a high frequency output from the high-frequency module 29 is connected to the reflector 106 and radio waves can be transmitted or received through the reflector 106. Therefore, the reflector 106 functions as a radio antenna.

Moreover, the light-emitting device 37 is generally present at a position making it possible to transmit and receive radio waves to and from the outside of the electronic camera 10 but the position is not unconsciously touched by a user. Therefore, the communication performance is not deteriorated even if the reflector 106 is used as a radio antenna.

Figure 6:
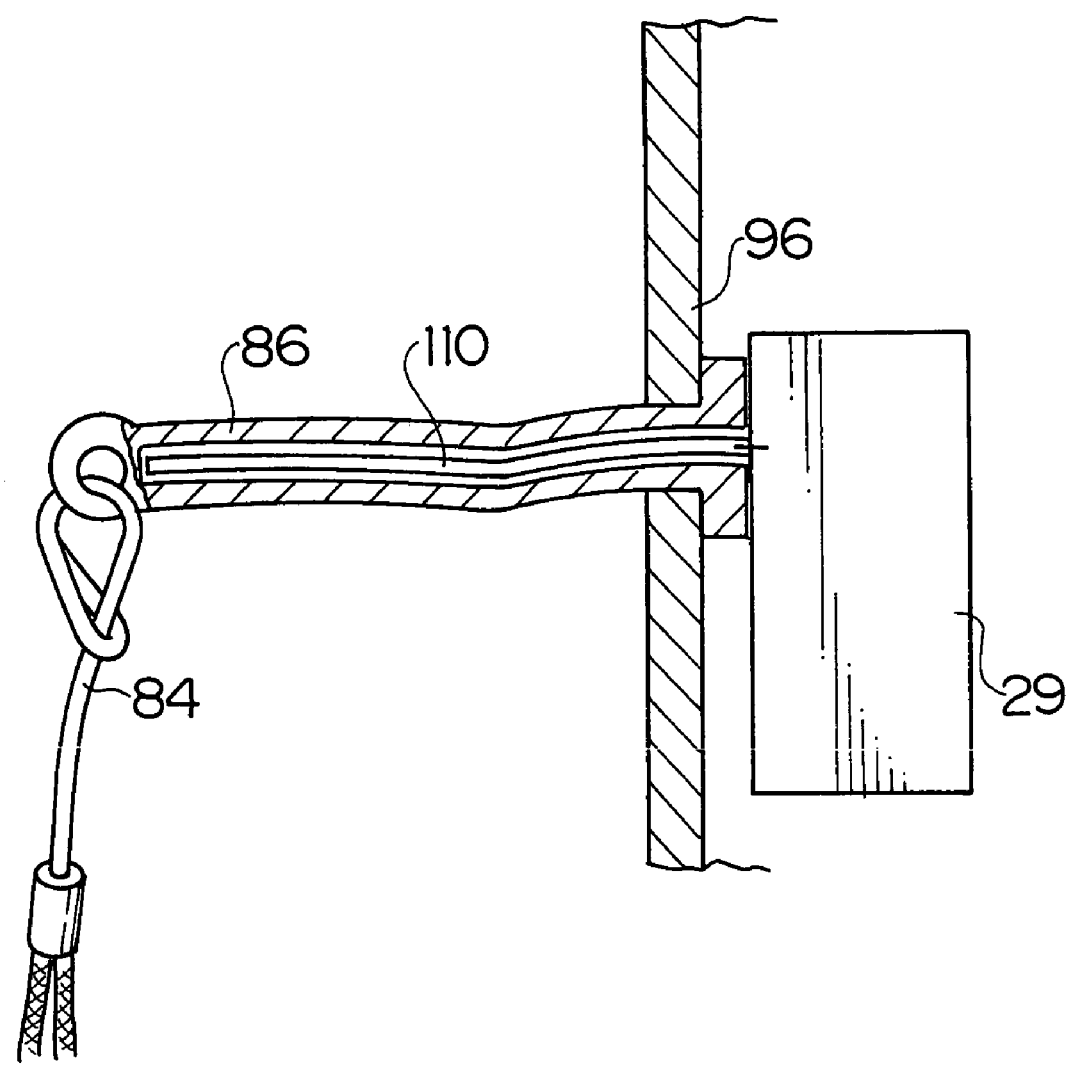
FIG. 6 is a sectional view showing an embodiment in which a radio antenna is provided for a strap holder of an electronic camera.

FIG. 6 shows a sectional view of a detailed embodiment in which a radio antenna is provided for the strap holder of an electronic camera.

In FIG. 6, a strap holder 86 of the electronic camera 10 constituted by an insulator is fixed to the armor member 96 of the electronic camera 10 and a radio antenna 110 constituted by a conductive component is set in the strap holder 86. Because the radio antenna 110 is connected to a line for the radio antenna of the high-frequency module 29, it is possible to transmit or receive radio waves. Because the strap holder 86 is generally exposed to the outside of the electronic camera 10, it is favorable to use the holder 86 as a radio antenna.

Moreover, it is allowed to constitute the strap holder 86 by setting the conductive strap 84 to the holder 86 so as to lengthen a radio antenna or constitute the strap holder 86 of a plastic material when the holder 86 protrudes long. Furthermore, it is allowed to constitute the strap holder 86 of a conductive material so as to function as a radio antenna by insulating the holder 86 from the armor member 96.

FIG. 7(*a*) shows a detailed sectional view when a radio antenna is mounted on a lens tube.

In FIG. 7(*a*), a lens tube 80 constituted by an insulator holding a lens 112 and a protective lens 114 is fixed to a front armor member 96. Moreover, a loop antenna 116 constituted by a conductive component for holding the protective lens 114 and functioning as a radio antenna is provided for a part of the lens tube 80. As shown in FIG. 7(*b*), the loop antenna 116 is connected with the high-frequency module 29 by high-frequency cables 104 and 104. FIG. 7(*a*) is described by using an example in which the loop antenna 116 is set to the inside of the lens tube 80. However, it is also allowed to the loop antenna 116 for an operation ring or lens-holding ring on the outside of the lens tube.

Thus, by setting the loop antenna 116 to the lens tube 80, it is possible to obtain a large antenna and preferably keep a communication state.

Moreover, in FIG. 3, it is possible to achieve an object of the present invention by constituting the mode-switching dial 90, a camera operating button such as the release button 88, an operating dial, and an operating member represented by an operating lever of conductive components, insulating the components from the armor member 96 of the electronic camera 10, connecting them with a high-frequency cable 104, and using them as a radio antenna.

Furthermore, it is allowed to use the medium cover 92, battery cover 94, a ring member around a photographing ring, and a lens cover as a radio antenna by constituting the components of conductive components, insulating them from the armor member 96 of the electronic camera 10, and connecting them with the high-frequency cable 104. Thus, by using members necessary for a conventional camera as a radio antenna, it is unnecessary to newly independently use a radio antenna. Therefore, it is possible to decrease a camera in size and decrease the cost.

As described above, a camera of the present invention jointly uses a conductive component previously provided for the camera and insulated from a camera housing but not electromagnetically shielded as a radio antenna. Therefore, the camera allows radio communication with other unit without using an independent radio antenna.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera, comprising:

a camera housing;

a communication device, accommodated inside the camera housing, which allows radio communication with another unit; and a non-communicating purpose component attached to the camera housing, said non-communicating purpose component being a conductive component insulated from the camera housing but not shielded electromagnetically, the non-communicating purpose component also serving as a radio antenna, operatively connected with said communication device and outputting and/or receiving radio waves to/from said another unit, and the non-communicating purpose component being disposed where the non-communication purpose component is not unconsciously touched by a user during a picture taking operation, wherein the non-communicating purpose component includes a lens tube for supporting a lens therein.

2. A camera, comprising:

a camera housing;

a communication device, accommodated inside the camera housing, which allows radio communication with another unit; and a non-communicating purpose component attached to the camera housing, said non-communicating purpose component being a conductive component insulated from the camera housing but not shielded electromagnetically, the non-communicating purpose component also serving as a radio antenna, operatively connected with said communication device and outputting and/or receiving radio waves to/from said another unit, and the non-communicating purpose component being disposed where the non-communication purpose component is not unconsciously touched by a user during a picture taking operation, wherein the non-communicating purpose component includes a hot shoe to which an accessory is set, the hot shoe being attached to the camera housing through an insulating spacer and an insulating washer by a hot-shoe fixing screw.

3. The camera according to claim 1, wherein
said communication device includes a high frequency module connected to said non-communicating purpose component by a high frequency cable.

4. A camera, comprising:
a camera housing;
a communication device, accommodated inside the camera housing, which allows radio communication with another unit; and
a non-communicating purpose component attached to the camera housing, said non-communicating purpose component being a conductive component insulated from the camera housing but not shielded electromagnetically, the non-communicating purpose component also serving as a radio antenna, operatively connected with said communication device and outputting and/or receiving radio waves to/from said another unit, and the non-communicating purpose component being disposed where the non-communication purpose component is not unconsciously touched by a user during a picture taking operation,
wherein the non-communicating purpose component includes a reflector of a flash, the reflector being provided inside an opening formed in the camera housing.

5. A camera, comprising:
a camera housing;
a communication device, accommodated inside the camera housing, which allows radio communication with another unit; and
a non-communicating purpose component attached to the camera housing, said non-communicating purpose component being a conductive component insulated from the camera housing but not shielded electromagnetically, the non-communicating purpose component also serving as a radio antenna, operatively connected with said communication device and outputting and/or receiving radio waves to/from said another unit, and the non-communicating purpose component being disposed where the non-communication purpose component is not unconsciously touched by a user during a picture taking operation,
wherein the non-communicating purpose component includes a ring member provided inside a lens tube and surrounding a lens.

6. A camera, comprising:
at least one member selected from a group consisting of a hot shoe to which an accessory is set, a reflector of a flash, a lens tube for supporting the lens therein, a ring member that supports the lens with respect to the lens tube, and a cover for a battery compartment provided at a bottom of the camera;
a communication device which allows radio communication with another unit, wherein
one of said at least one member is connected to said communication device as a radio antenna for outputting and/or receiving radio waves to/from said another unit, said at least one member is formed by a conductive component insulated from a camera housing, but not electromagnetically shielded,
wherein, each member of the group being disposed where said each member is not unconsciously touched by a user during a picture taking operation.

7. The camera according to claim 6, wherein said at least one member is the lens tube.

8. A camera, comprising:
at least one member selected from a group consisting of a hot shoe to which an accessory is set, a reflector of a flash, a lens tube for supporting the lens therein, a ring member that supports the lens with respect to the lens tube, and a cover for a battery compartment provided at a bottom of the camera;
a communication device which allows radio communication with another unit, wherein
one of said at least one member is connected to said communication device as a radio antenna for outputting and/or receiving radio waves to/from said another unit, said at least one member is formed by a conductive component insulated from a camera housing, but not electromagnetically shielded,
wherein, each member of the group being disposed where said each member is not unconsciously touched by a user during a picture taking operation, and
wherein said at least one member is the hot shoe.

9. A camera, comprising:
at least one member selected from a group consisting of a hot shoe to which an accessory is set, a reflector of a flash, a lens tube for supporting the lens therein, a ring member that supports the lens with respect to the lens tube, and a cover for a battery compartment provided at a bottom of the camera;
a communication device which allows radio communication with another unit, wherein
one of said at least one member is connected to said communication device as a radio antenna for outputting and/or receiving radio waves to/from said another unit, said at least one member is formed by a conductive component insulated from a camera housing, but not electromagnetically shielded,
wherein, each member of the group being disposed where said each member is not unconsciously touched by a user during a picture taking operation, and
wherein said at least one member is the reflector.

10. A camera, comprising:
at least one member selected from a group consisting of a hot shoe to which an accessory is set, a reflector of a flash, a lens tube for supporting the lens therein, a ring member that supports the lens with respect to the lens tube, and a cover for a battery compartment provided at a bottom of the camera;
a communication device which allows radio communication with another unit, wherein
one of said at least one member is connected to said communication device as a radio antenna for outputting and/or receiving radio waves to/from said another unit, said at least one member is formed by a conductive component insulated from a camera housing, but not electromagnetically shielded,
wherein, each member of the group being disposed where said each member is not unconsciously touched by a user during a picture taking operation, and
wherein said at least one member is the ring member.

* * * * *